Feb. 27, 1951　　　M. W. MEIERHOFF　　　2,543,665
PRESSURE AND RELIEF VALVE ARRANGEMENT
Filed March 3, 1948　　　　　　　　　　　　2 Sheets-Sheet 2
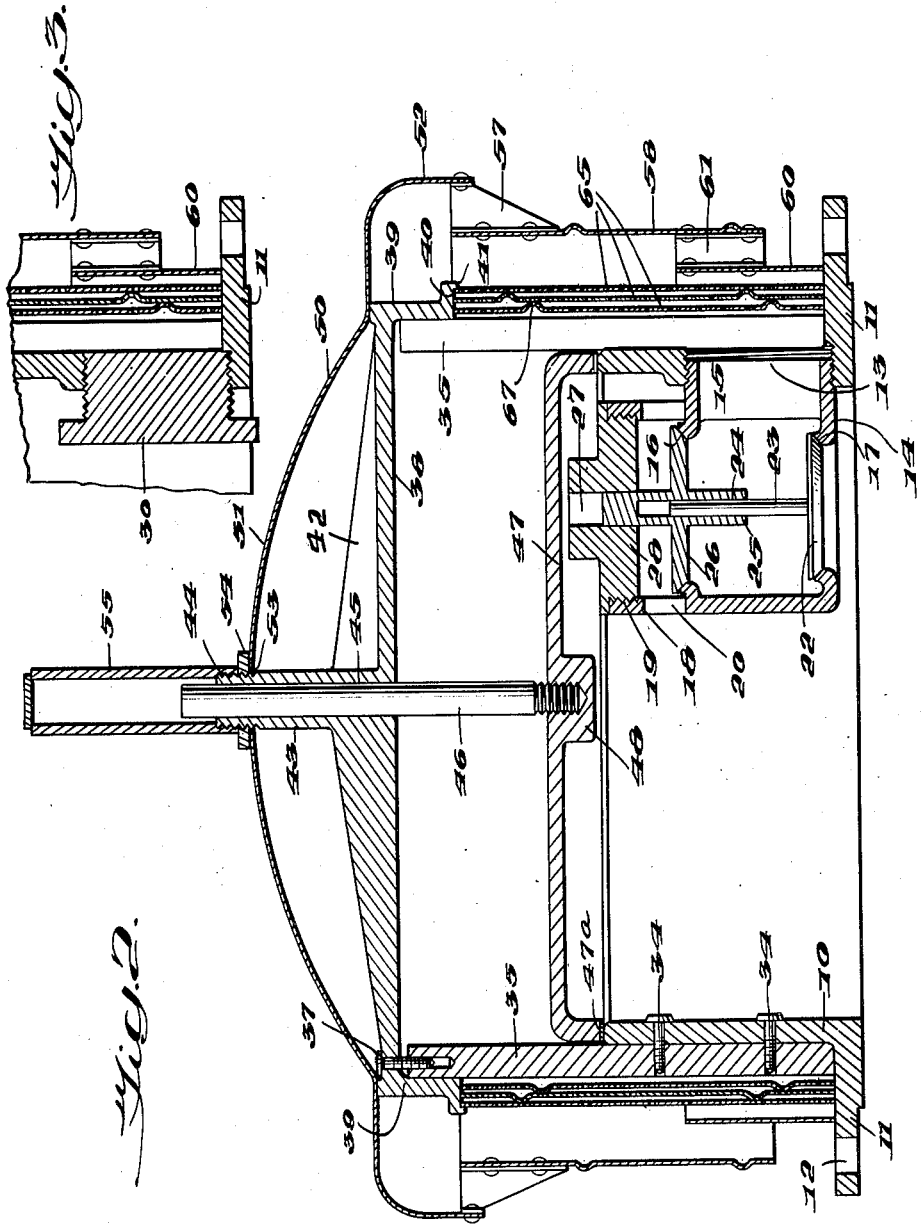
Inventor
MARVIN W. MEIERHOFF,
By Robert B. Larson
Attorney Patented Feb. 27, 1951

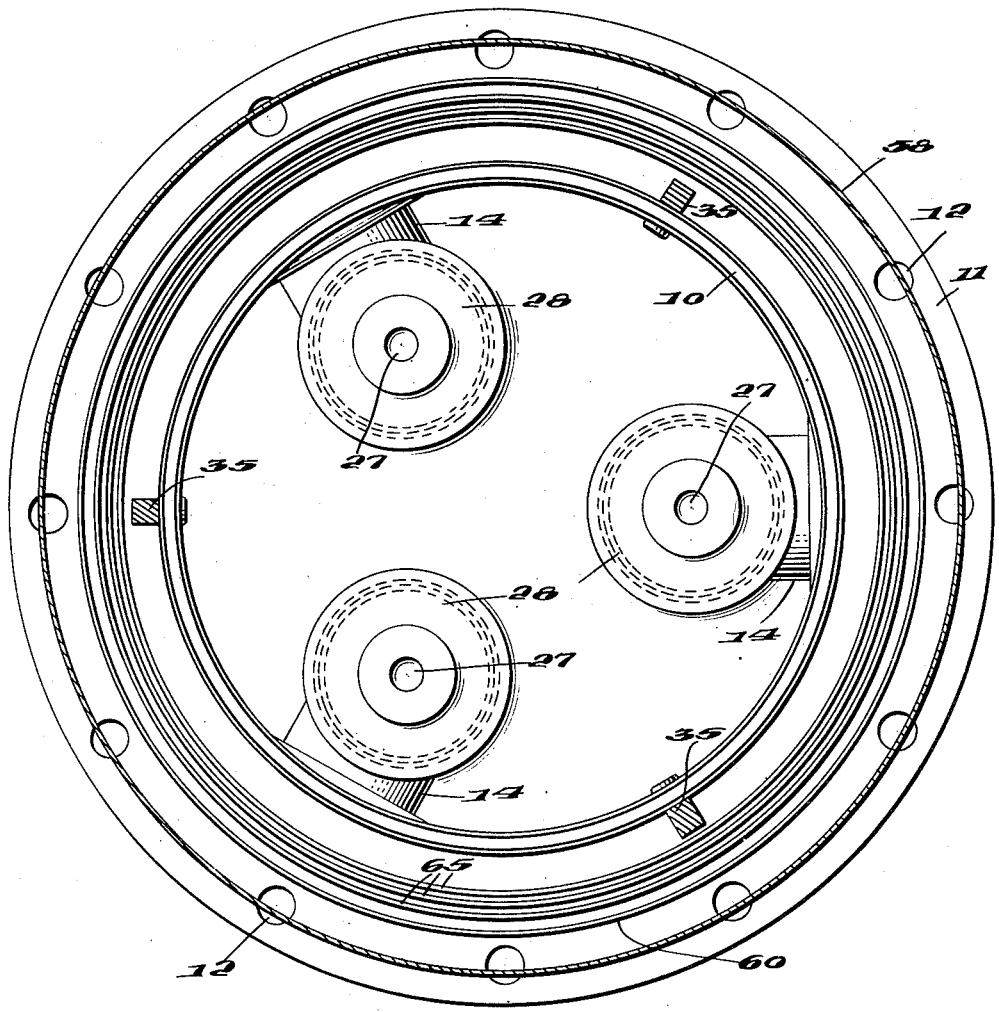

2,543,665

UNITED STATES PATENT OFFICE 2,543,665

PRESSURE AND RELIEF VALVE ARRANGEMENT

Marvin W. Meierhoff, Duluth, Minn.

Application March 3, 1948, Serial No. 12,823

7 Claims. (Cl. 220—88)

This invention relates to a pressure and vacuum relief valve arrangement particularly intended for use on storage tanks containing volatile and/or inflammable petroleum products.

In the storage of volatile liquids such as gasoline and kerosene, it is desirable to provide a pressure relief valve for permitting gases to leave the tank when the tank is being filled or when the temperature causes the pressure within the tank to increase, and it is also desirable to provide a vacuum relief valve to permit air to enter the tank when liquid is being removed from the tank. It is also desirable to provide a large pressure relief valve for permitting the exit of explosive gases in large volume in case of fire or other great pressure increases.

One object of this invention is to provide a valve structure which has pressure and vacuum relief valves of the type described above Another object of the invention is to provide a valve arrangement which is compact in nature and which has a large volume safety pressure relief valve, a small pressure relief valve, a vacuum relief valve, and a flame arrestor.

Another object of the invention is to provide a valve arrangement as just described incorporated in a weather shield.

Another object of the invention is to provide a pressure and vacuum relief valve as just described in which the number of small pressure relief valves and vacuum relief valves may be varied to provide for variations in the size of the fill line connected to the tank.

A further object of the invention is to provide a valve arrangement of the type referred to above which is simple to construct and maintain.

Still another object of the invention is to provide a relief valve structure provided with a novel weather protection arrangement.

A further object of the invention is to provide a valve arrangement of the type referred to above in which the valves are so situated as to be protected against frosting up and sticking during cold weather.

These and other objects of the invention will be apparent from the following specification taken in conjunction with the accompanying drawings, in which Fig. 1 is a plan view of the novel valve arrangement;

Fig. 2 is a vertical sectional view taken through Fig. 1; and

Fig. 3 is a detail sectional view of a portion of Fig. 2 but showing a plug inserted in place of the small pressure and relief valve structure.

In the preferred embodiment of the invention shown in the drawing, a main valve body 10 is formed with a bottom flange 11 having spaced bolt holes 12 for attaching the structure to a tank (not shown). The valve body 10 may be of aluminum or other suitable material, and has in its upwardly extending body portion one or more threaded openings 13, three such openings are shown in the drawing, although a different number may be used if desired.

Each opening 13 threadedly receives a smaller valve body 14 which has a short connecting portion 15 and upper and lower vertically aligned valve seats 16 and 17. Above the upper valve seat there is an integral upwardly extending portion 18 of the valve body 14, open at the upper end which is threaded at 19. Portion 14 also has spaced openings 20 in its vertical wall above the upper valve seat. A pressure relief valve 22 is normally seated on valve seat 17 by its own weight. A valve stem 23 extends upwardly from the center of valve 22 and slidably extends into a cavity 24 in the valve stem 25 which extends above and below a vacuum relief valve 26 resting normally on upper valve seat 16. The upper portion of valve stem 25 fits slidably within a central guide opening 27 in a valve guide 28 which engages threads 19 to close the opening in the upper end of upwardly extending valve body portion 18.

One or more of the smaller valve bodies 14 and valves carried thereby may be used with a single valve body 10, the unused openings 13 being closed by means of threaded plugs 30 as shown in Fig. 3. If it is desired to omit all of the structures 14, all of the holes 13 may be closed by plugs 30.

With this pressure and relief valve arrangement, the two valves 22 and 26 are maintained normally closed by their own weights and by the pressures on their upper surfaces.

Secured by screws 34 to the valve body 10 and spaced 120 degrees apart are three upright guide supports 35 which extend above the upper edge of the valve body 10 a substantial distance. Screws 37 fasten a cover and main pressure relief valve guide 38 to the upper ends of supports 35. Guide 38 is in the form of a disc having at its periphery a downwardly extending flange 39, the lower end of which is flattened at 40 and has an external downwardly extending rim 41 for a purpose to be described presently.

Guide 38 has on its upper surface three equally spaced radially extending ribs 42 which are of gradually increasing height toward the center of the guide 38 where they meet at an upwardly extending hub 43 which is externally threaded at its upper end at 44. A hole 45 extends axially through guide 38 and through hub 43, and a main pressure relief valve stem 46 extends slidably into this hole. The lower end of stem 46 is threaded into the center of a main pressure relief valve 47 which has a downwardly extending peripheral flange, the edge of which is bronze faced at 47a and normally rests on the upper edge of valve body 10. A central boss 48 is formed on the lower surface of valve 47 at a position corresponding to the point of threaded engagement of valve stem 46 with valve 47.

A cover 50 of sheet aluminum having an arched central portion 51, a downwardly bent peripheral portion 52, and a central opening 53 is placed over the top of the valve structure with the opening 53 receiving the threaded portion 44 of hub 43. A lock nut 54 is screwed onto the threads 44 over the cover 50 and a tubular cap 55 closed at its upper end and internally threaded at its lower end is screwed onto the threads 44 above the lock nut.

Eight U-shaped spacers 57 of sheet aluminum are spaced about the interior surface of peripheral portion 52 of cover 50 and are attached by rivets to the cover and to a weather protector 58 also of sheet aluminum, cylindrical in shape and extending from a point slightly above the surface 40 and the lower edge of cover portion 52 downwardly to a point spaced substantially above the flange 11 of valve body 10 to leave ample space for passage of air and/or gases.

An ice protector 60 of sheet aluminum cylindrical in shape is attached to the lower portion of protector 58 by spacers 61 similar to spacers 57. Protector 60 extends from the surface of flange 11 upwardly a substantial distance above the lower edge of protector 58 to provide a tortuous path for gases entering or leaving the valve structure. A similar tortuous path is provided above the upper edge of protector 58 so that snow, sleet, and rain are effectively excluded from the interior of the structure.

In order to arrest any flames entering or leaving the valve structure, a flame arrestor structure comprising three screens 65 is provided. Screens 65 may comprise cylindrical perforated rust proof metal sheets or preferably comprise corrugated and perforated sheets, the corrugations 67 serving to maintain spacing between the screens as shown in the drawing. The screens surround guide supports 35 and extend from the upper surface of flange 11 to the flat surface 40 of the flange 39 of guide 38 where they are maintained in place by depending rim 41.

In operation, the normal inflow and outflow of gases with expansion and contraction due to slight temperature changes, as well as the changes in the internal pressure caused by filling and emptying are taken care of by small pressure and vacuum relief valves 22 and 26. In case of a sudden large increase in internal pressure, the large valve 47 will be lifted off of its seat by the pressure. This valve seats by metal-to-metal contact so as to eliminate any possibility of seat deterioration due to fire. Because of its larger weight, valve 47 opens at a higher pressure than small valve 22.

The arrangement of the flame arrestors 65, cover 50, and weather protectors 58 and 60 gives complete protection to the valves against outside weather conditions as well as flames. The design of the flame arrestor structure is such as to accommodate the total capacity of both the large and small pressure relief valves. The weather shield not only performs its function efficiently but also presents a pleasing streamlined appearance.

By installing the small pressure and relief valves 22 and 26 inside the main valve structure, they are protected not only by the weather protectors 50, 60 and 58, but also by the main valve structure 10 and 47. This assists greatly in eliminating frosting of the valves during cold weather, and since the smaller valves are intended to operate upon small pressure changes, it is quite important that their freedom of action remain unimpaired.

As pointed out above, the number of small valve structures used with each unit may be varied according to operating conditions, and if desired, the unit may be limited to use as a pressure relief valve only by placing plugs in all of the holes 13.

I wish it to be understood that I have described only a preferred embodiment of the invention and that changes in the form, proportion and minor details of construction may be made without departing from the inventive concept as expressed in the appended claims.

I claim:

1. A valve arrangement comprising a first hollow valve body open at both ends, a first valve normally closing one end of said body and movable by pressure within said body to an open position spaced from said body, said body having at least one opening in its wall, a smaller valve body mounted within said first valve body and secured in said opening with its interior in communication with the exterior of said first valve body through said opening, and pressure and vacuum relief valves substantially smaller in size than said first valve mounted on said smaller valve body to control communication between the interior of said smaller valve body and the interior of said first valve body, whereby small pressure changes within said first valve body are relieved by said small pressure and vacuum relief valves, while large increases in pressure within said first valve body are relieved by said first valve.

2. A valve arrangement as set forth in claim 1 in which there are a plurality of said openings in the wall of said first valve body, at least one of said openings carrying one of said smaller valve body and valve structures, and removable plugs closing the remainder of said openings.

3. A valve arrangement comprising a first vertically extending tubular valve body open at both ends, a first valve normally resting by its weight on one end of said body to close said end, and movable by relatively large increases in pressure within said body to open position spaced from said body, said valve body having at least one threaded opening in its wall, a second and smaller valve body positioned within said first valve body and supported by threaded engagement with said opening, said second valve body having two vertically aligned valve seats providing communication between the interior of said first valve body and the interior of said second valve body, a pressure relief valve normally seated on and closing the lower seat, and a vacuum relief valve normally seated on and closing said upper seat, whereby large pressure increases within said first valve body are relieved by said first valve, smaller pressure increases are relieved by said small pressure relief valve, and vacuums within said first valve body are relieved by said vacuum relief valve, with said smaller valves being protected by said first valve body and valve.

4. A valve arrangement as set forth in claim 3, a plurality of spaced upright guide elements attached to the exterior of said main valve body and extending upwardly beyond the upper edge of said valve body, a disc-like member attached to the upper ends of said guide elements and provided with a central vertically extending guide opening, and a valve stem attached to said first valve and extending upwardly for sliding movement within said guide opening.

5. A valve arrangement as set forth in claim 4, said disc-like member having an upwardly extending hub, a cover member having a central opening and positioned over said disc-like member with said central opening receiving said hub, means carried by said hub for maintaining said cover in place, and baffle means attached to the peripheral portion of said cover and surrounding said first valve body for protecting the valve arrangement from the weather.

6. A valve arrangement as set forth in claim 3, a horizontally extending flange on the lower end of said main valve body, a plurality of spaced upright guide elements attached to the exterior of said main valve body and extending upwardly beyond the upper edge of said valve body, a disc-like member attached to the upper ends of said guide elements and provided with a central vertically extending guide opening, a valve stem attached to said first valve and extending upwardly for sliding movement within said guide opening, said disc-like member having an upwardly extending hub, a cover member having a central opening and positioned over said disc-like member with said central opening receiving said hub, means carried by said hub for maintaining said cover in place, said cover having a peripheral portion extending laterally beyond the disc-like member and downwardly, an upper weather shield spaced inwardly from said downwardly extending cover portion and attached thereto, said shield comprising a tubular sheet extending downwardly from a point above the lower edge of said peripheral cover portion, and a lower weather shield similar to said upper shield attached thereto in overlapping relation and extending upwardly from the upper surface of the flange on said main valve body beyond the lower edge of said upper shield to provide a tortuous path for gases passing said weather shield and complete protection for the valves from snow, rain and the like.

7. A valve arrangement as set forth in claim 3, a horizontally extending flange on the lower end of said main valve body, a plurality of spaced upright guide elements attached to the exterior of said main valve body and extending upwardly beyond the upper edge of said valve body, a disc-like member attached to the upper ends of said guide elements and provided with a central vertically extending guide opening, a valve stem attached to said first valve and extending upwardly for sliding movement within said guide opening, said disc-like member having an upwardly extending hub, a cover member having a central opening and positioned over said disc-like member with said central opening receiving said hub, a tubular cap threadedly engaging said hub for maintaining said cover in place and receiving the upper end of said valve stem, said cover having a peripheral portion extending laterally beyond the disc-like member and downwardly, an upper weather shield spaced inwardly from said downwardly extending cover portion and attached thereto, said shield comprising a tubular sheet extending downwardly from a point above the lower edge of said peripheral cover portion, and a lower weather shield similar to said upper shield attached thereto in overlapping relation and extending upwardly from the upper surface of the flange on said main valve body beyond the lower edge of said upper shield to provide a tortuous path for gases passing said weather shield and complete protection for the valves from snow, rain and the like, a downwardly extending flange at the periphery of said disc-like member, said flange having a flat lower end surface provided at its outer edge with a downwardly extending rim, and at least one perforate metal flame screen surrounding said main valve body and upright guide elements, said flame screen being clamped between the flange on said main valve body and the flat lower end surface of the flange of said disc-like member, said downwardly extending rim maintaining said flame screen in the correct lateral position.

MARVIN W. MEIERHOFF.

REFERENCES CITED

The following references are of record in the file of this patent:

UNITED STATES PATENTS

| Number | Name | Date |
| --- | --- | --- |
| 1,890,870 | Tokheim | Dec. 13, 1932 |
| 1,902,258 | Muller | Mar. 21, 1933 |
| 1,929,462 | Woidick | Oct. 10, 1933 |
| 2,112,641 | Wheaton | Mar. 29, 1938 |
| 2,152,422 | Tokheim | Mar. 28, 1939 |
| 2,160,684 | Spaeth | May 30, 1939 |
| 2,188,022 | Tokheim | Jan. 23, 1940 |